Feb. 23, 1926. 1,574,344
J. C. GARNER
MACHINE FOR REGINNING COTTON AND OTHER FIBROUS MATERIALS
Original Filed March 17, 1919    7 Sheets-Sheet 1

Feb. 23, 1926. 1,574,344
J. C. GARNER
MACHINE FOR REGINNING COTTON AND OTHER FIBROUS MATERIALS
Original Filed March 17, 1919 7 Sheets-Sheet 2

WITNESS:
J. R. Burns
N. J. Burns

INVENTOR.
James C. Garner
BY H. H. Bliss
ATTORNEY.

Feb. 23, 1926.
J. C. GARNER
1,574,344

MACHINE FOR REGINNING COTTON AND OTHER FIBROUS MATERIALS

Original Filed March 17, 1919    7 Sheets-Sheet 6

Inventor
James C. Garner
By H. H. Bliss
Attorney

Witness

Feb. 23, 1926. 1,574,344
J. C. GARNER
MACHINE FOR REGINNING COTTON AND OTHER FIBROUS MATERIALS
Original Filed March 17, 1919 7 Sheets-Sheet 7

Patented Feb. 23, 1926.

1,574,344

UNITED STATES PATENT OFFICE.

JAMES C. GARNER, OF HOUSTON, TEXAS.

MACHINE FOR REGINNING COTTON AND OTHER FIBROUS MATERIALS.

Application filed March 17, 1919, Serial No. 283,202. Renewed August 3, 1923.

*To all whom it may concern:*

Be it known that JAMES C. GARNER, a citizen of the United States, residing at Houston, in the county of Harris and State of Texas, has invented certain new and useful Improvements in Machines for Reginning Cotton and Other Fibrous Materials, of which the following is a specification.

This invention relates to machines for reginning cotton and other fibrous materials.

One object of the invention is to provide a machine of the character described, which is specially adapted for cleaning and renovating cotton and similar fibrous materials. As is well known, to those familiar with the cotton industry, and particularly with the preparation of cotton for market, there is a considerable amount of low grade cotton which comes on the market as a product of said industry, and which commands a much lower price than first grade cotton. This low grade cotton is a product of the ginning and baling processes, and usually consists of the lint, which falls from the gins and presses, and which is gradually accumulated and baled, together with the dirt and other foreign matter which collects with it. Also partially burned bales of cotton, and cotton otherwise damaged or containing a great deal of dirt and other foreign matter, falls in the same class, and by reason of its condition, commands a low price. All of this second grade cotton, from whatever source it comes, contains fiber, which is of comparatively good quality, and the grade of which, when it is rid of its tangled and trashy condition, is greatly improved. It is the object of this invention to provide a machine, whereby said cotton may be cleaned and renovated, and thereby converted into first grade cotton.

Another object of the invention resides in the provision of means whereby the fiber may be straightened out and untangled, and the dirt and other foreign matter removed therefrom.

Further features of this invention consist of an improved saw, for working the fiber, the provision of improved means for separating the dirt and other foreign matter from the fiber when it is opened up by the saws, the provision of a combined air blast nozzle and suction nozzle for cleaning the fiber from the saws and the provision of means for separating and handling such parts of the fiber as are not thoroughly cleaned or renovated, so that they can be subjected to a second treatment.

With the above and other objects in view, the invention has particular relation to certain novel features of construction, operation and arrangement of parts, an example of which is given in this specification and illustrated in the accompanying drawings, wherein.

Figure 3:
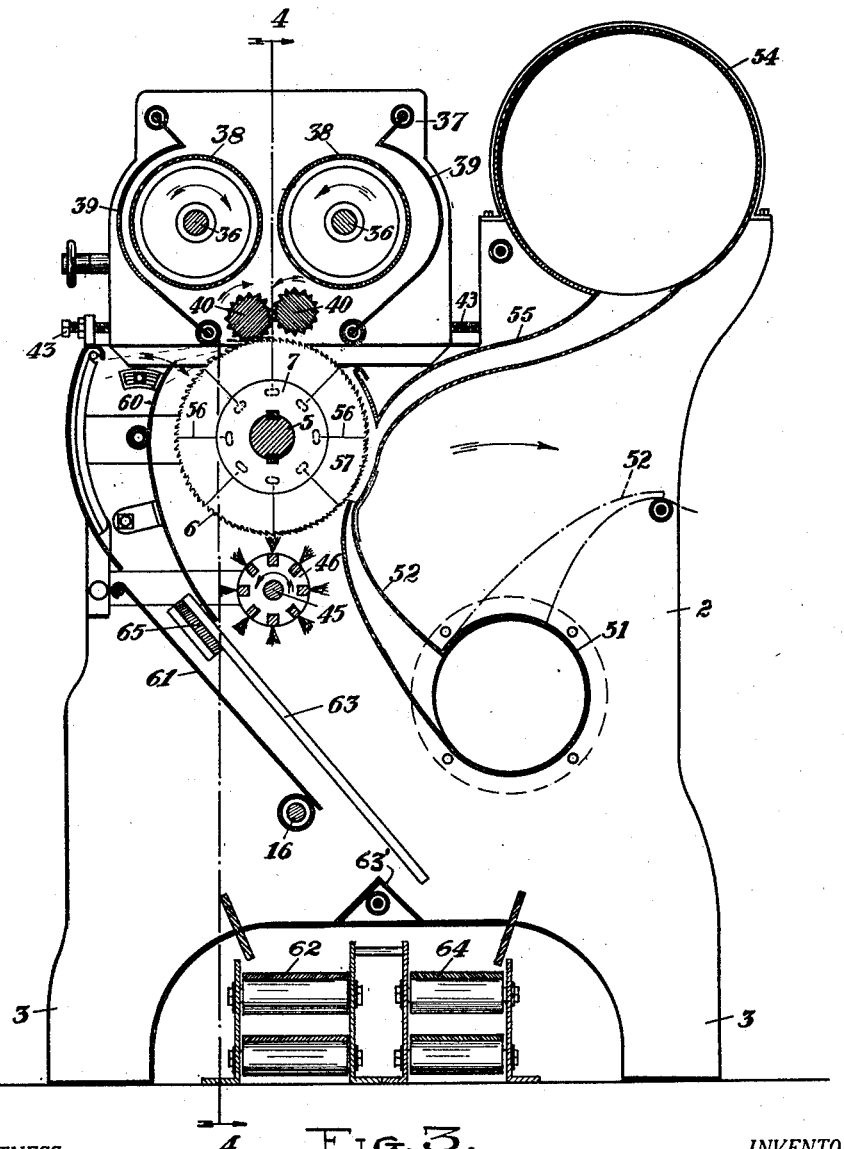
Figure 3 is a transverse sectional view, taken on the line 3—3 of Figure 4.
Figure 4:
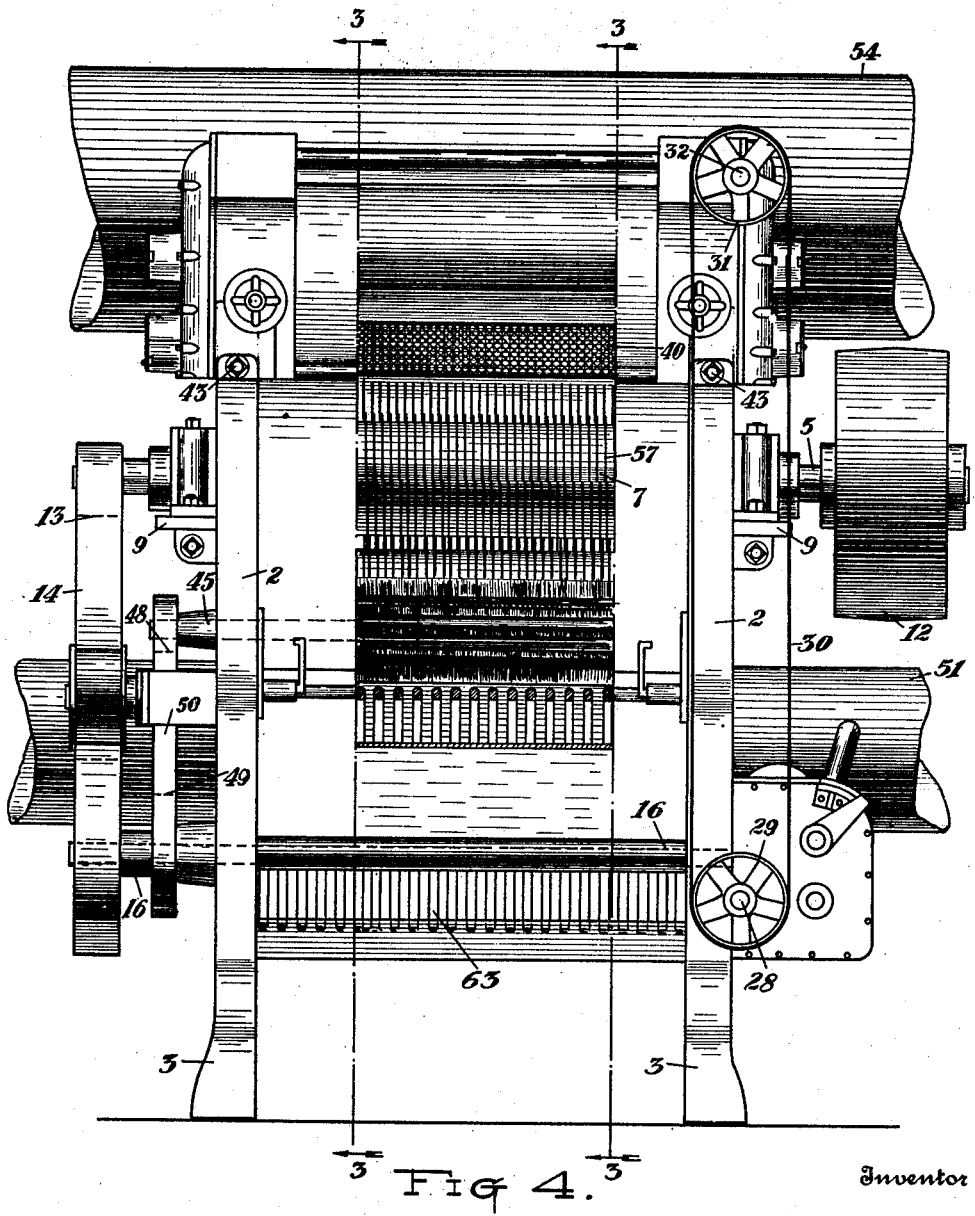
Figure 5:
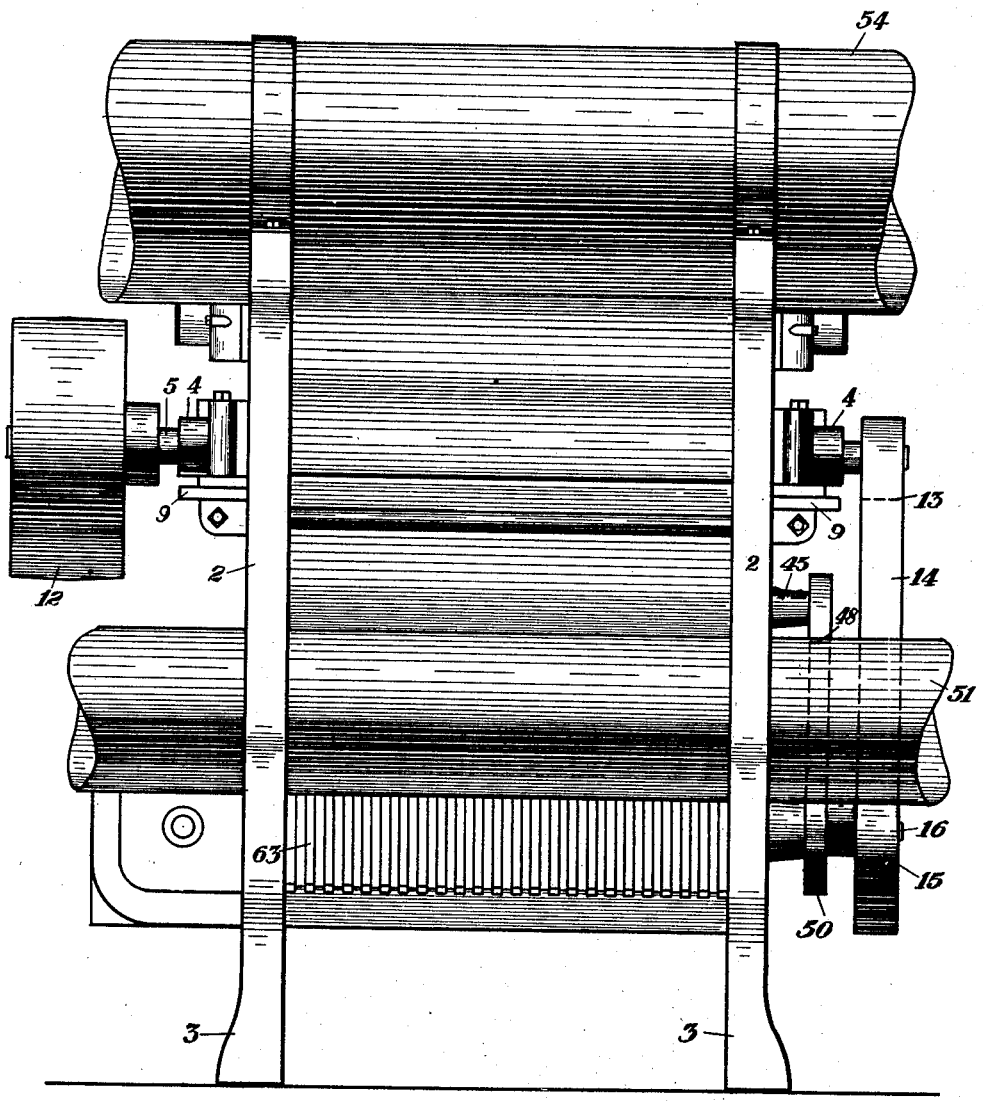
Figure 7:
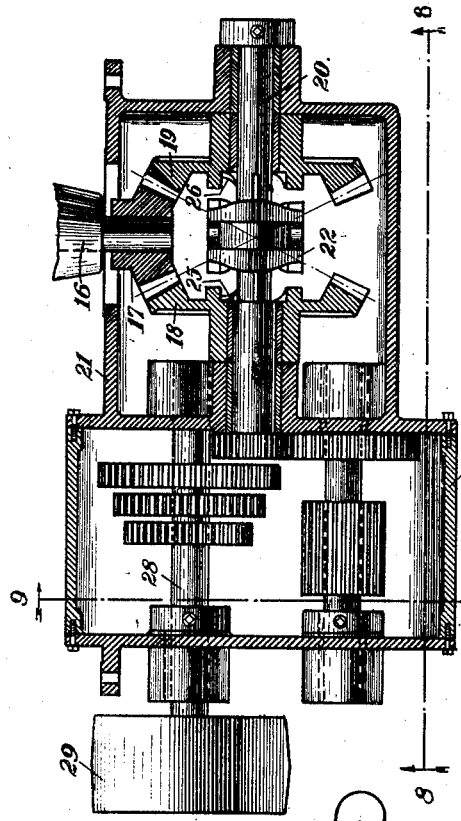
Figure 8:
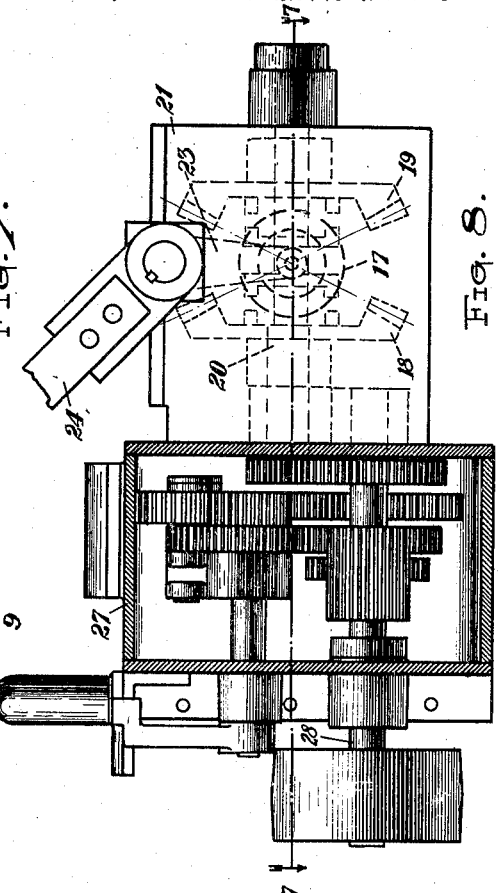
Figure 6:
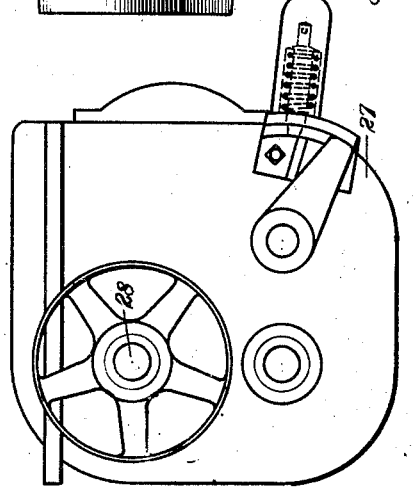
Figure 9:
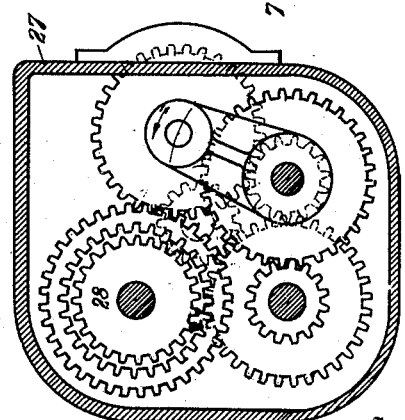
Figure 11:
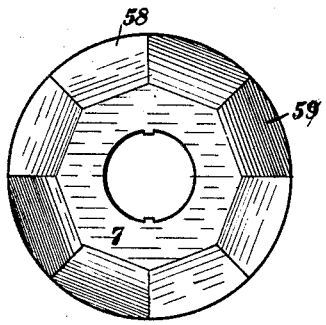
Figure 10:
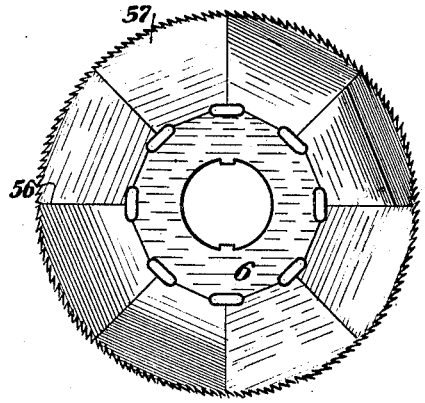
Figure 12:
Figure 13:
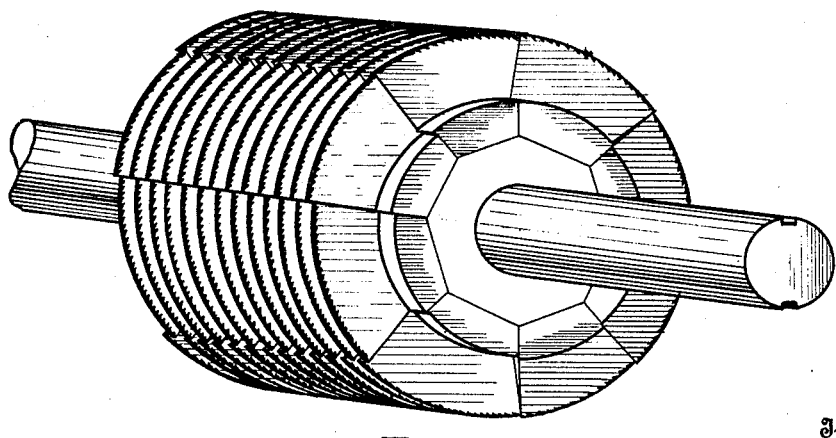

Figure 4 is a front elevation, shown partially in section, taken on the line 4—4 of Figure 3, Figure 5 is a rear view of the device, Figure 6 is an end view of a transmission mechanism employed, Figure 7 is a sectional view thereof, taken on the line 7—7 of Figure 8, Figure 8 is a sectional view thereof, taken on the line 8—8 of Figure 7, Figure 9 is a transverse sectional view thereof, taken on the line 9—9 of Figure 7, Figure 10 is a side view of one of the saws employed, Figure 11 is a side view of one of the spacing blocks, Figure 12 is a diagrammatic view of the periphery of the saw, and of the blocks, and Figure 13 is a perspective view of the saw drum.

Figure 1:
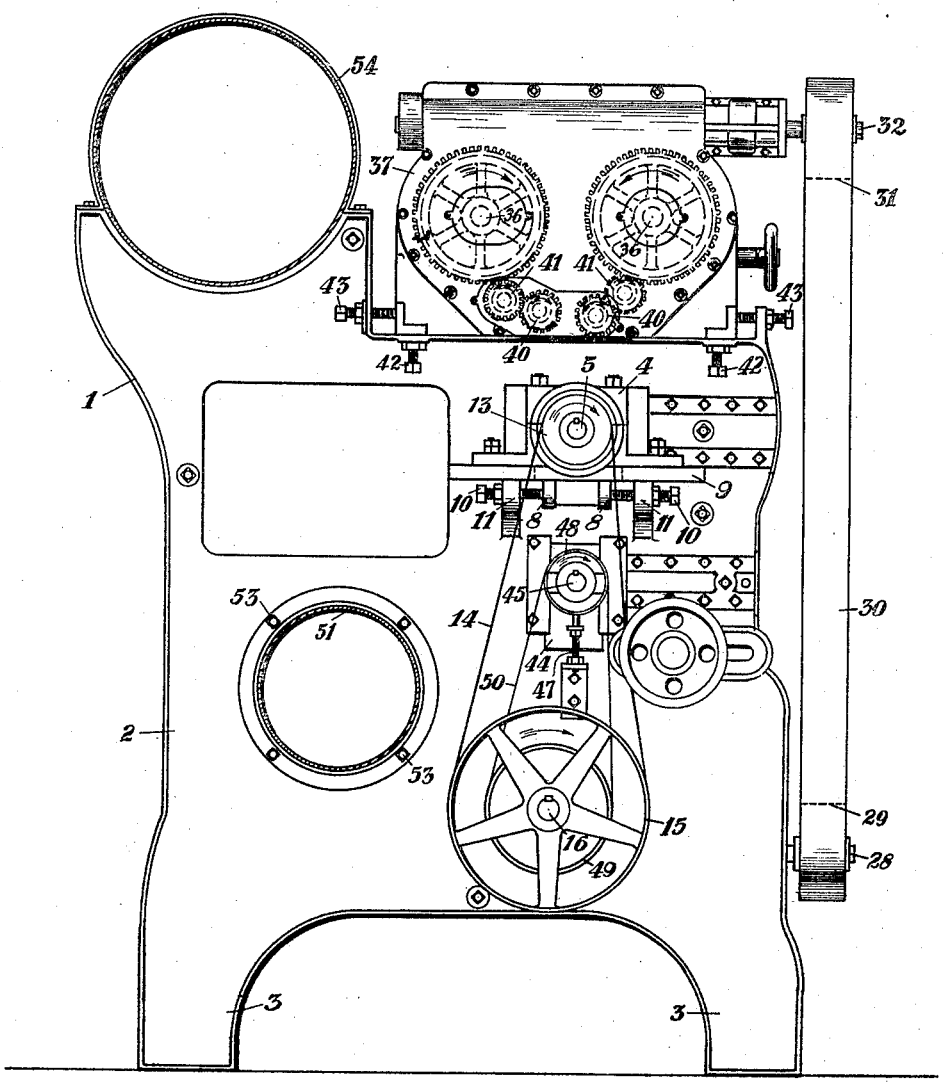
Figure 1 is a right side elevation of the device.
Figure 2:
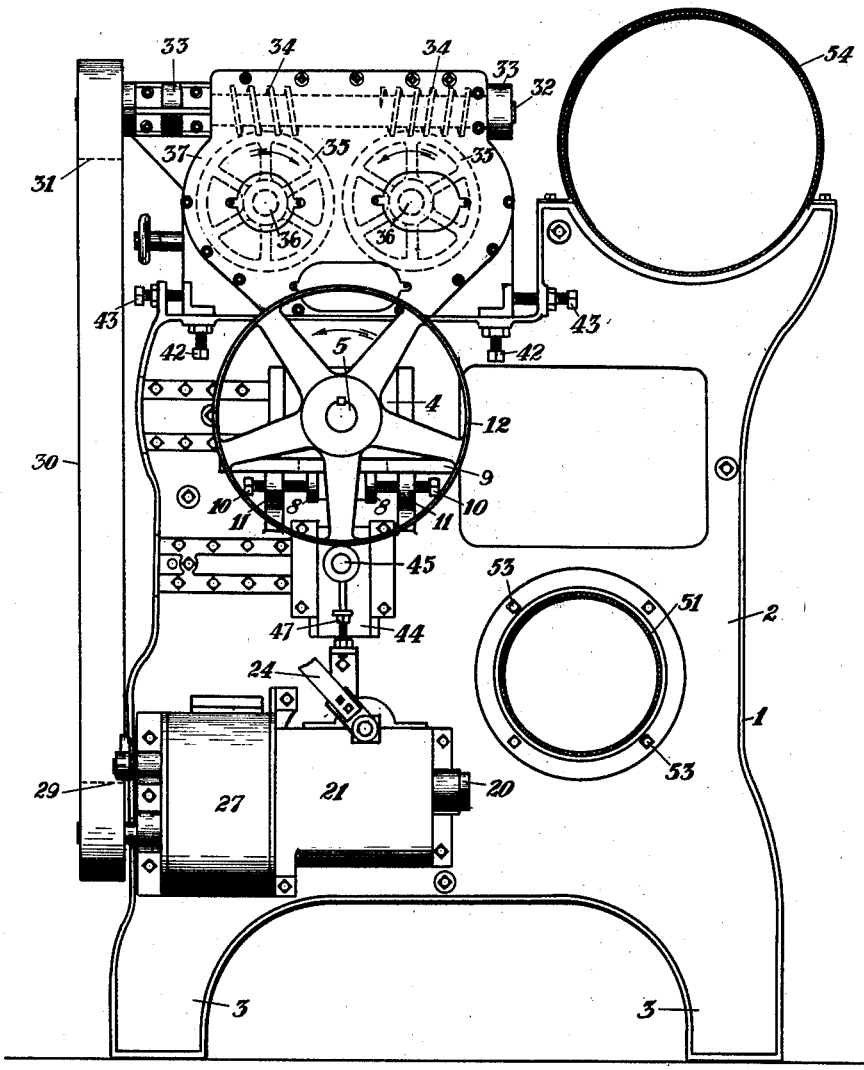
Figure 2 is a left side elevation thereof.

Referring now more particularly to the drawings, wherein like numerals of reference designate similar parts in each of the figures, the numeral 1, designates the frame of the machine, taken as a whole. This frame has the end plates 2, 2, spaced the required distance apart, each being supported by the respective legs 3, 3. Mounted in the end bearings 4, 4, of the frame, is the transverse shaft 5, fixed upon which are the disc-like saws 6, which are spaced apart by means of the annular spacing blocks 7. The bearings 4 have depending lugs 8, 8, which project down through corresponding slots in the ledges 9, 9, projecting outwardly from the corresponding end plates, and set screws 10, 10, are threaded through the respective bearings 11, 11, carried by said end plates, and their inner ends rest against the corresponding lugs 8, 8. Through the instrumentality of these set screws, the bearings 4 and the saws carried thereby may be adjusted for the purpose hereinafter explained. Fixed upon one end of the shaft 5, there is a pulley 12, through which rotation may be imparted to the shaft 5, and the saws carried thereby, and fixed to the other end of said shaft 5, is the pulley 13, over which the belt 14 operates. This belt also operates over and drives the pulley 15, which is fixed upon one end of the shaft 16. The opposite end of this shaft carries the fixed pinion 17 (Fig. 7), which is in mesh with the bevel gear wheels 18 and 19, which are loosely mounted upon the short shaft 20, said pinion, bevel gear wheels and shaft being housed in the clutch casing 21. Splined upon the shaft 20 between the gear wheels 18 and 19, is a clutch member 22, which is manipulated in the usual manner through the clutch fork 23. This fork is operated through the lever 24, so as to force the clutch member 22 into and out of engagement with corresponding clutch members 25, and 26, into which the inner ends of the hubs of the bevel gear wheels 18 and 19, respectively, are formed. Provision is thus made for driving the shaft 20 in a forward or reverse direction, and for declutching the same from the shaft 16. Adjacent the clutch casing 21, and preferably formed integrally therewith, there is the transmission casing 27, containing any well known form of transmission mechanism through which a variable speed may be transmitted from the driving shaft 20 to the driven shaft 28. This last mentioned shaft is rotatably mounted in suitable bearings in the transmission casing, and its outer end has fixed thereon, the pulley 29, over which the belt 30 operates. This belt also operates over and drives the pulley 31, which is fixed upon the front end of the worm gear shaft 32. This last mentioned shaft is rotatable in suitable bearings 33, 33, carried by the compression roller casing, and is formed with reverse right or left hand worm gears 34, 34, which are in mesh with the corresponding worm gear wheels 35, 35, fixed upon the transverse shafts 36, 36. These shafts have end bearings in the end plates 37, 37, of the compression roller casing, and mounted upon them, are the compression rollers 38, 38 (Fig. 3), which are spaced apart, and which rotate in the direction indicated by the arrows in Figures 1, 2 and 3, when delivering material to the saws. On their outer sides, the compression rollers 38 are partially surrounded by means of arcuate hoods 39, 39, which extend from end to end of said casing, and which converge downwardly below said rollers, forming, in effect, a hopper. Within this hopper and underneath the compression rollers are the gripping rollers 40, 40, which are located close and extend parallel to each other, and to the compression rollers, and are spaced from the latter. These gripping rollers are driven from the compression rollers through the intermediate spur gear wheels 41, 41, (Fig. 1) and their surfaces are corrugated, as shown in Figure 3, or toothed, as illustrated in Figure 4, so as to readily engage with the fiber as will be hereinafter explained. The compression roller casing is mounted above the frame 1, and is vertically adjustable through the instrumentality of the adjusting screws 42, 42, and may be also adjusted forwardly and rearwardly through the instrumentality of the adjusting screws 43, 43. Rotatably mounted in the bearings 44, 44, carried by the end plates 2, 2, is the transverse shaft 45, fixed upon which is the cylindrical mote brush 46. This brush is arranged underneath the saws, and the bearings thereof are vertically adjustable through the adjusting screws 47, thus providing for the adjustment of the mote brush toward and from the saws. One end of the shaft 45 has the pulley 48, fixed thereon which is in alignment with the corresponding pulley 49, which is fixed upon the shaft 16, and a belt 50 operates over these pulleys and transmits rotation from the latter to the former.

Extending transversely through the end plates 2, and located in the rear of and beneath the saws, there is an air blast pipe 51, which is formed with an air blast nozzle 52. This nozzle extends from end to end of the machine and terminates adjacent the saws in the rear and is provided to discharge an air blast against said saws. The pipe is anchored to the end plates by means of bolts 53, which may be readily removed, permitting the pipe to turn so that the nozzle 52 may be withdrawn to the position shown in dotted lines in Figure 3, thus permitting access to said nozzle and saws for cleaning or any other purpose. Above the pipe 51, and supported by the frame, there is a suction flue pipe 54, which is formed with a suction nozzle 55, extending from end to end of the machine, the free end of which is arranged adjacent the saws above the air blast nozzle, and is hoodlike in form, so as to partially surround said saws in the rear to assist in cleaning the fiber from the saws as will be hereinafter explained.

The cotton to be cleaned and renovated is fed from the feeder into the gin through between the compression rollers 38, 38 and is by them, partially compressed and formed into a loose bat and said bat passed thence between the gripping rollers 40, 40, and is by these last mentioned rollers gradually fed to the saws. A comparatively compact bat is thus presented to the saw drum substantially equal in width to the length of said drum, and it is desirable that the toothed surface of the said drum should operate upon every point in the end of the advancing bat, so as to insure a thorough working of the material.

For this reason, each saw 6 has been provided with radial slits as 56, which separate the peripheral part of each saw into a plurality, preferably eight, of independent segments, 57, separate from each other, but formed integral with the plane central part of the saw.

As before stated, the saws are clamped on the shaft 5, between the spacing blocks 7. The peripheral part of the facing sides of these blocks are configured with elevations 58, on one side of the center, and depressions 59 on the opposite side of the center line, as shown in Figure 12, which represents a diagrammatic representation of the periphery of the segments in relation to each other. The elevations and depressions are in the same relative position to each other, so that when the saws are clamped between the blocks, the segments 57 will be in the same relative position to each other as the elevation and depression on the disc or spacing blocks. A toothed drum is thus provided which is well adapted when rotated, to work upon all parts of the end of the bat fed against it. It is to be noted that the saws rotate at a comparatively high rate of speed, and the rotation of the compression rollers and the gripping rollers may be regulated through the transmission mechanism hereinbefore referred to so as to feed the fiber to the saws, as rapidly as the same can be worked by them, the same depending upon the condition of the fiber being delivered.

In front of the saws, there is a concave adjustable mote board 60, extending from end to end of the frame. This mote board is pivoted so as to be adjustable in the direction as shown by the arrow (Figure 3) in proper relation with the saws. The motes and other solid particles are thrown by centrifugal force of the saws over said mote board and fall down behind the same onto the stationary mote slide 61, and by it, they are conducted to a transverse conveyer 62, arranged underneath the gin, and by said conveyer, this foreign matter is conveyed away. The lint is held by the saw teeth, and carried around by them, but any lumps of matted and unworked fiber which may be clinging to the teeth will be knocked off of the teeth by the rapidly rotating mote brush 46, and dropped upon the mote grate formed of spaced fingers 63, which are fastened at their upper ends to the transverse finger support 65, whose ends are anchored to the respective end plates 2. The fingers 63 are kept in vibration by the vibration of the machine, when in operation and by this means, the unworked fibers and such motes and foreign matters as fall upon said fingers are kept in a downward movement causing the foreign matter to be shaken between the fingers and to be deflected by the deflector 63' onto the conveyer 62. The unworked fibers are held on the fingers and finally delivered to the conveyer 64, to be conveyed again to the feeder for reworking.

The lint is cleaned from the saws by means of the combined action of the air blast nozzle 32, and the suction nozzle 55. An air blast is created by fan pressure and driven through said first mentioned nozzle tangentially against the saws with the effect that the lint acted upon by it, is cleaned from the teeth and separated into a fluffy mass, which is drawn into the lint flue 54, through the suction nozzle 55, said air suction being created by suction fan not shown.

In case, the gin should become choked by reason of the fiber being fed into it too fast, the compression rollers may be reversed by reversing the clutch mechanism hereinbefore described, and shown in Figures 7 and 8, and the congestion thus readily relieved without stopping the operating of the gin.

The saws will eventually become dull and the teeth must be resharpened. Often the saws will meet with some foreign metallic obstruction, and the teeth will be stripped, or the saw will be deformed, and not be perfectly circular at its periphery, then the teeth must be recut, making a saw of a slightly smaller diameter. By means of this type of saw, the process of sharpening or recutting is easily and quickly accomplished by any standard method of sharpening and cutting teeth. After the saws are sharpened or recut, and have thereby become smaller in outside diameter, they are replaced on the shaft between the discs and pressed into their original shape, forming a substantially continuous surface of rotation, and in order to maintain them in proper position, relative to the blast and suction nozzles, they may be adjusted through the mechanism hereinbefore described, and in order to maintain them in proper relation to the corresponding rollers 40, 40, the compression roller casing may be adjusted downwardly by suitable manipulation of the adjusting screws 42, 42.

What I claim is:

1. A device of the character described, including a frame, a toothed drum, rotatably mounted therein, compression rollers and gripping rollers provided to feed a fibrous bat to said drum, an adjustable mote board arranged in front of and spaced from said drum over which the motes are thrown from said bat by the centrifugal force of the drum, and an inclined mote slide constructed and arranged for the passage therethrough of the motes and for the retaining and separate delivery of the fiber arranged to receive said motes and conduct them to a conveyer.

2. A device of the character described, including a frame, a toothed drum rotatably mounted therein, compression rollers and gripping rollers through which a bat of fibrous material is delivered to said drum, an adjustable mote board arranged in front of the drum, and a mote grate arranged underneath said board and formed of spaced fingers and arranged to receive the material delivered by said drum to said mote board.

3. A device of the character described, including a frame, a transverse toothed drum rotatably mounted therein, means for feeding a bat of fibrous material to said drum, an adjustable mote board arranged in front of the drum over which the motes are thrown from said bat by the centrifugal force of said drum, an inclined mote slide arranged underneath said mote board, a mote grate, arranged underneath said mote board and formed of spaced fingers, and conveyers arranged to receive material from said mote slide and mote grate respectively.

4. A device of the character described, including a frame, a transverse toothed drum rotatably mounted therein, means for feeding fibrous material to said drum in the form of a bat, an adjustable mote board arranged in front of the drum, an air blast nozzle arranged to discharge an air blast against the saws of which said drum is formed, and a suction nozzle arranged adjacent said saws, and provided to receive the fibre cleaned from the saws of said air blast.

5. A device of the character described, including a frame, a toothed drum rotatably mounted therein, and formed of a shaft and a series of disclike saws fixed thereon, means for feeding fibrous material in the form of a bat to said drum, a mote board arranged in front of said drum, over which the motes from said bat are thrown by the centrifugal force of the drum, a mote slide arranged to receive said motes, a mote grate arranged underneath said mote board formed of spaced fingers and provided to receive material from said mote board, conveyers arranged to receive material from said mote slide, and mote grate, respectively, an air blast nozzle arranged to discharge an air blast against said saws to clean the fiber therefrom, and a suction nozzle arranged adjacent the saws and provided to receive said fiber cleaned from the saws by said air blast.

6. The combination of cotton-feeding means, saws arranged to receive the cotton so fed, and to retain the fibers thereof and to throw to one side the heavier motes, a mote board having its upper end arranged near to the point where the cotton is so received by the saws, so that the heavier motes will pass over the top of the board and be separately collected and so that the lighter motes and light separated fiber will pass down at the inner side of the board, a moting brush operating on the material carried by the saws to leave the laid fibers on the saws and to remove remaining motes and tangled lumps of fiber, a mote-separating slide to which said removed material is delivered by the moting board, and a blast nozzle and, spaced therefrom, a blast-receiving suction nozzle both arranged at the periphery of said saws so that the violently moving air will remove the fibers from the saws at said space between the nozzles.

In testimony whereof, he has signed his name to this specification.

JAMES C. GARNER.